(12) United States Patent
Ishiguro et al.

(10) Patent No.: US 10,253,145 B2
(45) Date of Patent: *Apr. 9, 2019

(54) METHOD FOR PRODUCING A POLYLACTIC ACID-BASED FILM OR SHEET

(71) Applicant: NITTO DENKO CORPORATION, Ibaraki-shi, Osaka (JP)

(72) Inventors: Shigeki Ishiguro, Ibaraki (JP); Hiroki Senda, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 755 days.

This patent is subject to a terminal disclaimer.

(21) Appl. No.: 14/875,736

(22) Filed: Oct. 6, 2015

(65) Prior Publication Data

US 2016/0024265 A1   Jan. 28, 2016

Related U.S. Application Data

(62) Division of application No. 13/122,076, filed as application No. PCT/JP2009/067176 on Oct. 1, 2009, now abandoned.

(30) Foreign Application Priority Data

Oct. 2, 2008   (JP) .................. 2008-257383

(51) Int. Cl.
*C08J 5/18*   (2006.01)
*B29C 43/00*   (2006.01)
(Continued)

(52) U.S. Cl.
CPC .............. *C08J 5/18* (2013.01); *B29C 43/003* (2013.01); *B29C 43/24* (2013.01);
(Continued)

(58) Field of Classification Search
CPC ........... B29K 2067/00; B29K 2067/046; C08J 2367/04; C08J 5/18; C09D 4/06
(Continued)

(56) References Cited

U.S. PATENT DOCUMENTS 6,066,217 A   5/2000  Dibble et al.
8,729,165 B2*  5/2014  Ishiguro ............... B29C 43/003
                                          524/127
(Continued)

FOREIGN PATENT DOCUMENTS

CN   101023133 A   8/2007
EP   1 792 941 A1  6/2007
(Continued)

OTHER PUBLICATIONS

Office Action, dated Apr. 30, 2014, issued by the State Intellectual Property Office of the People's Republic of China, in counterpart Application No. 200980139110.3.

(Continued)

*Primary Examiner* — Alexander M Weddle
(74) *Attorney, Agent, or Firm* — Sughrue Mion, PLLC

(57) ABSTRACT

A method of producing a polylactic acid based film or sheet with improved heat resistance and comprised of a resin composition containing a polylactic acid according to a melt film forming method, wherein the resin composition comprises polylactic acid (A), an acidic functional group-denatured olefin based polymer (B) containing an acidic functional group, and having an acid number of 10-70 mg KOH/g and a weight average molecular weight of 10,000-80,000, and a tetrafluoroethylene based polymer (C), which method comprises performing melt film formation at a temperature of the resin composition between the crystallization temperature (Tc) in a decreasing temperature process of the resin composition +15° C. and the melting tempera- (Continued)

ture (Tm) in a raising temperature process −5° C., or solidifying the resin composition melt-formed in a film state by cooling after a temperature controllable step at crystallization temperature (Tc) in the decreasing temperature process ±10° C.

14 Claims, 2 Drawing Sheets

(51) Int. Cl.
- B29C 43/24 (2006.01)
- C08L 23/02 (2006.01)
- C08L 67/02 (2006.01)
- C08L 67/04 (2006.01)
- C09D 4/06 (2006.01)
- B29C 47/00 (2006.01)
- B29K 67/00 (2006.01)
- C08L 23/26 (2006.01)
- C08L 27/18 (2006.01)
- C08L 51/06 (2006.01)
- B29C 47/88 (2006.01)
- B29C 47/90 (2006.01)

(52) U.S. Cl.
CPC ...... *B29C 47/0019* (2013.01); *B29C 47/0021* (2013.01); *C08L 23/02* (2013.01); *C08L 67/02* (2013.01); *C08L 67/04* (2013.01); *C09D 4/06* (2013.01); *B29C 47/8845* (2013.01); *B29C 47/906* (2013.01); *B29K 2067/00* (2013.01); *B29K 2067/046* (2013.01); *B29K 2995/006* (2013.01); *B29K 2995/0056* (2013.01); *C08J 2367/04* (2013.01); *C08L 23/26* (2013.01); *C08L 27/18* (2013.01); *C08L 51/06* (2013.01); *C08L 2205/03* (2013.01)

(58) Field of Classification Search
USPC ........................................................ 264/175
See application file for complete search history.

(56) References Cited

U.S. PATENT DOCUMENTS

| | | | |
|---|---|---|---|
| 8,916,631 B2 * | 12/2014 | Ishiguro | B29C 43/24 524/127 |
| 2005/0001349 A1 | 1/2005 | Yosimura et al. | |
| 2005/0032961 A1 | 2/2005 | Oguni et al. | |
| 2005/0136271 A1 | 6/2005 | Germroth et al. | |
| 2005/0137304 A1 | 6/2005 | Strand et al. | |
| 2008/0262151 A1 | 10/2008 | Ishii et al. | |
| 2010/0004404 A1 | 1/2010 | Suzuki et al. | |
| 2010/0130699 A1 | 5/2010 | Ikegame et al. | |
| 2012/0003459 A1 | 1/2012 | Ishiguro et al. | |
| 2012/0021202 A1 | 1/2012 | Senda et al. | |
| 2012/0046402 A1 | 2/2012 | Senda et al. | |
| 2012/0052281 A1 | 3/2012 | Ishiguro et al. | |

FOREIGN PATENT DOCUMENTS

| | | |
|---|---|---|
| JP | 8-252895 A | 10/1996 |
| JP | 11-116788 A | 4/1999 |
| JP | 2001-200144 | 7/2001 |
| JP | 2002-129042 A | 5/2002 |
| JP | 3330712 B2 | 9/2002 |
| JP | 2002-327124 | 11/2002 |
| JP | 2003-147213 | 5/2003 |
| JP | 2006-016447 | 1/2006 |
| JP | 2006-045487 A | 2/2006 |
| JP | 2006-160925 | 6/2006 |
| JP | 2006-321988 A | 11/2006 |
| JP | 2007-130893 A | 5/2007 |
| JP | 2007-130894 A | 5/2007 |
| JP | 2007-516867 A | 6/2007 |
| JP | 2007177213 | 7/2007 |
| JP | 2007-326940 A | 12/2007 |
| JP | 2009-096892 A | 5/2009 |
| WO | 03/042302 A1 | 5/2003 |
| WO | 2008/018474 A1 | 2/2008 |

OTHER PUBLICATIONS

Office Action dated Feb. 4, 2014, issued by the Japan Patent Office in corresponding Japanese Application No. 2009-229735.
Notification of Second Office Action issued by the State Intellectual Property Office of P.R. China in corresponding CN Application No. 200980139110.3, dated Oct. 12, 2013.
European Office Action issued in corresponding EP Application No. 09817865.0 dated Sep. 3, 2013.
Notice of Reasons for Refusal issued in JP Application No. 229735/2009, dated Feb. 26, 2013.
Notification of First Office Action issued in CN Application No. 200980139110.3 dated Jan. 16, 2013.
Supplementary European Search Report dated Jan. 25, 2012.
International Search Report dated Oct. 1, 2009.
Hirofumi Inoue, "Hensei Teibunshiryo Polyolefin-kei Jushi Kaishitsuzai", San'yo Kasei News, Sanyo Chemical Industries, Ltd, 2005, pp. 1-4.
Fred W. Billmeyer, Jr, "Textbook of Polymer Science, 3$^{rd}$ Edition" John Wiley & Sons, Inc., New York pp. 464-465 (1984).

* cited by examiner

METHOD FOR PRODUCING A POLYLACTIC ACID-BASED FILM OR SHEET

This is a divisional of application Ser. No. 13/122,076 filed Apr. 26, 2011, which is a national stage of PCT/JP2009/067176 filed Oct. 1, 2009, which claims priority from Japanese Patent Application No. 2008-257383 filed Oct. 2, 2008, the contents of all of which are incorporated herein by reference in their entirety.

TECHNICAL FIELD

The present invention relates to a polylactic acid based film or sheet with improved heat resistance, which can maintain the shape of a formed film even at a high temperature.

BACKGROUND ART

Polylactic acid is a plant-derived biomass polymer, and is drawing attention as a resin replacing the petroleum-derived polymers.

However, although polylactic acid (in the present invention, to be said poly-L-lactic acid having L-form of optical isomer as main component) is a crystalline polymer, its crystallization speed is extremely slow, and polylactic acid is hardly crystallized by a method comprising nipping with cooling rolls after melt film formation which is a general film formation condition.

Therefore, improvement of heat resistance of polylactic acid based films has been conventionally tried by some methods as mentioned below.

For example, after sheeting according to a melt extrusion method and the like, stretch-oriented crystallization is performed by biaxial stretching to express heat resistance during film formation of polylactic acid (patent document 1).

However, due to a residual internal stress from stretching in this method, heat shrink defectively becomes extremely high when high temperature is used. Therefore, the temperature that can be actually used is about 100° C. at most.

In addition, an attempt has been made to express heat resistance by blending other high melting point materials with polylactic acid (patent document 2).

In this method, however, problems of decreased ratio of plant-derived components (biomass ratio), decreased transparency and the like occur.

In the field of molding materials, an attempt has been actively made to form in a short time at a low metal mold temperature by increasing the crystal growth rate by the addition of a crystal nucleating agent and the like. In the case of film formation, however, the film is generally cooled to not more than the glass transition temperature immediately after melt film formation, so as to maintain the shape of the film. Since a film is thin as compared to molded parts and the cooling rate becomes high by this cooling method. Thus, addition of a useful nucleating agent is hardly effective.

As for this problems, promotion of crystallization by providing a heating step at 60 to 100° C. in a step after film formation has been suggested (patent document 3). This temperature range is also described to aim at suppression of deformation of a formed film due to detachment failure from a metal roll of polylactic acid.

However, this method is inefficient since heating is applied again after cooling once for solidification.

DOCUMENT LIST

Patent Documents patent document 1: JP-B-3330712
patent document 2: JP-A-11-116788
patent document 3: JP-A-2007-130894

SUMMARY OF THE INVENTION

Problems to be Solved by the Invention

Conventional polylactic acid based films are thermally deformed under an environment of not less than the glass transition temperature of polylactic acid (about 60° C.), and fail to maintain the original shapes; when they are transparent, they may be problematically whitened due to recrystallization. In addition, an adhesive tape having a polylactic acid based film as a substrate and an adhesive applied thereon may be deformed or melted during a drying process since, after application of, for example, a solvent or aqueous adhesive, the film is passed through an oven at about 100-150° C. to render the adhesive into a solid content alone to afford an adhesive tape. Therefore, an adhesive tape can be prepared only by a method including separately preparing an adhesive and transferring the adhesive onto a film, thus producing many problems such as reduced freedom of product constitution and the like.

Means of Solving the Problems

The present inventors have conducted intensive studies in an attempt to solve the aforementioned problems and found that addition of an acidic functional group-denatured olefin based polymer to polylactic acid facilitates detachment from a roll even at a temperature not less than the glass transition temperature (further, in a molten state at not less than the melting point), addition of a tetrafluoroethylene based polymer to polylactic acid enables improvement of melt tension and sufficient retention of the shape of the formed film even at not less than 100° C. (further, temperature near melting point), a tetrafluoroethylene based polymer contributes to promoted crystallization of polylactic acid, and further, setting the temperature of a step immediately after the film formation to the crystallization temperature of a resin mixture more effectively promotes crystallization of polylactic acid, which resulted in the completion of the present invention.

Accordingly, the present invention provides the following.

[1] A method of producing a film or sheet of a resin composition containing a polylactic acid according to a melt film forming method, wherein the resin composition comprises polylactic acid (A), an acidic functional group-denatured olefin based polymer (B) containing an acidic functional group, and having an acid number of 10-70 mg KOH/g and a weight average molecular weight of 10,000-80,000, and a tetrafluoroethylene based polymer (C), which method comprises performing a melt film formation step at a temperature of the resin composition between the crystallization temperature (Tc) in a decreasing temperature process of the resin composition +15° C. and the melting temperature (Tm) in a raising temperature process −5° C., or solidifying the resin composition melt-formed in a film state by cooling after a crystallization promoting step at crystallization temperature (Tc) in a decreasing temperature process ±10° C.

[2] The production method of the above-mentioned [1], wherein the melt film formation step is performed at a temperature of the resin composition between the crystallization temperature (Tc) in a decreasing temperature process of the resin composition +15° C. and the melting temperature (Tm) in a raising temperature process −5° C., and the resin composition melt-formed in a film state is solidified by cooling after a crystallization promoting step at crystallization temperature (Tc) in the decreasing temperature process ±10° C.

[3] The production method of the above-mentioned [1] or [2], wherein the acidic functional group-denatured olefin based polymer (B) is contained in a proportion of 0.1-5.0 parts by weight per 100 parts by weight of the polylactic acid (A).

[4] The production method of any of the above-mentioned [1] to [3], wherein the tetrafluoroethylene based polymer (C) is contained in a proportion of 0.1-10.0 parts by weight per 100 parts by weight of the polylactic acid (A).

[5] The production method of any of the above-mentioned [1] to [4], wherein the melt film forming method is a technique comprising finally passing the resin composition in a molten state through a gap between two metal rolls to achieve a desired film thickness.

[6] The production method of the above-mentioned [5], wherein the melt film forming method is a calender film forming method.

[7] A method of producing a film or sheet of a resin composition containing a polylactic acid according to a calender film forming method, wherein the resin composition comprises 100 parts by weight of polylactic acid (A), 0.1-5.0 parts by weight of an acidic functional group-denatured olefin based polymer (B) containing an acidic functional group, and having an acid number of 10-70 mg KOH/g and a weight average molecular weight of 10,000-80,000, and 0.1-10.0 parts by weight of a tetrafluoroethylene based polymer (C), which method comprises performing calendar-rolling in the calender film forming method at a temperature of the resin composition between the crystallization temperature (Tc) in a decreasing temperature process of the resin composition +15° C. and the melting temperature (Tm) in a raising temperature process −5° C., or solidifying the resin composition melt-formed in a film state by cooling after a crystallization promoting step at crystallization temperature (Tc) in a decreasing temperature process ±10° C.

[8] The production method of the above-mentioned [7], wherein the calendar-rolling in the calender film forming method is performed at a temperature of the resin composition between the crystallization temperature (Tc) in a decreasing temperature process of the resin composition +15° C. and the melting temperature (Tm) in a raising temperature process −5° C., and the resin composition melt-formed in a film state is solidified by cooling after a crystallization promoting step at crystallization temperature (Tc) in the decreasing temperature process ±10° C.

[9] The production method of any of the above-mentioned [1] to [8], wherein the acidic functional group in the acidic functional group-denatured olefin based polymer is an acid anhydride.

[10] The production method of any of the above-mentioned [1] to [9], further comprising 0.1-5.0 parts by weight of crystallizing agent (D) per 100 parts by weight of the polylactic acid (A).

[11] The production method of any of the above-mentioned [1] to [10], wherein the aforementioned crystallization promoting step of the resin composition is achieved by a metal roll.

[12] A film or sheet comprising a polylactic acid, which is comprised of a resin composition comprising polylactic acid (A), an acidic functional group-denatured olefin based polymer (B) containing an acidic functional group, and having an acid number of 10-70 mg KOH/g and a weight average molecular weight of 10,000-80,000, and a tetrafluoroethylene based polymer (C), and shows a change ratio of not more than 40% when applied with a load of 10N for 30 min under an atmosphere of 150° C. according to the Heat deformation test method of JIS C 3005, and a relative crystallization ratio as determined by the following formula (1)

$$\text{relative crystallization ratio } (\%) = (\Delta Hm - \Delta Hc)/\Delta Hm \times 100 \quad (1)$$

wherein ΔHc is an amount of heat at an exothermic peak due to crystallization in a raising temperature process of a film sample after film formation, and ΔHm is an amount of heat due to melting, of not less than 50%.

[13] The film or sheet of the above-mentioned [12], further showing a heat shrinkage ratio as determined by the following formula (2)

$$\text{heat shrinkage ratio } (\%) = (L1 - L2)/L1 \times 100 \quad (2)$$

wherein L1 is a gauge length before the test, and L2 is a gauge length after the test, of not more than 5% in both the machine direction (MD direction) and the width direction (TD direction) after preservation under a temperature atmosphere of 150° C. for 10 min.

[14] The film or sheet of the above-mentioned [12] or [13], wherein the acidic functional group-denatured olefin based polymer (B) is contained in a proportion of 0.1-5.0 parts by weight per 100 parts by weight of the polylactic acid (A).

[15] The film or sheet of any of the above-mentioned [12] to [14], wherein the tetrafluoroethylene based polymer (C) is contained in a proportion of 0.1-10.0 parts by weight per 100 parts by weight of the polylactic acid (A).

[16] The film or sheet of any of the above-mentioned [12] to [15], wherein the acidic functional group in the acidic functional group-denatured olefin based polymer is an acid anhydride.

[17] The film or sheet of any of the above-mentioned [12] to [16], further comprising 0.1-5.0 parts by weight of crystallizing agent (D) per 100 parts by weight of the polylactic acid (A).

Effect of the Invention

Provision of a polylactic acid based film or sheet with improved heat resistance.

DESCRIPTION OF EMBODIMENTS

Figure 1:
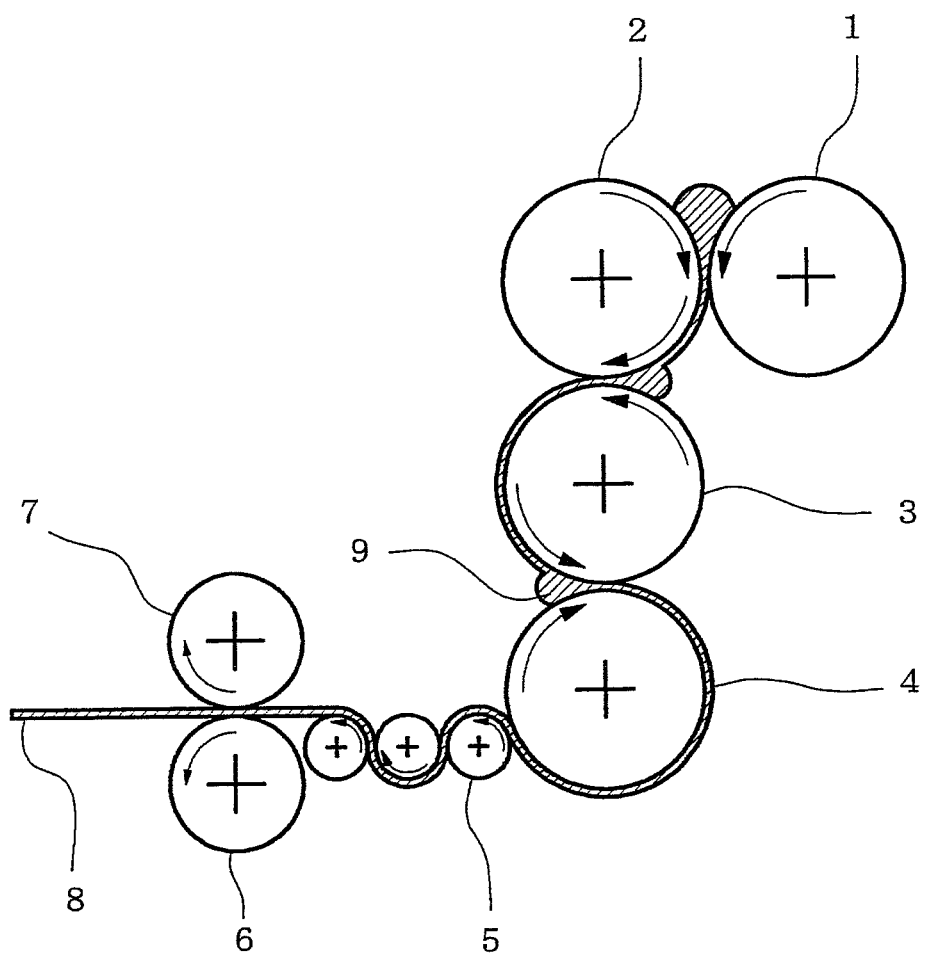
FIG. 1 is a schematic showing of a calender film forming machine.

The present invention is explained in detail in the following.

The polylactic acid based film or sheet of the present invention is produced by film forming a mixture of (A)

polylactic acid, (B) an acidic functional group-denatured olefin based polymer and (C) a tetrafluoroethylene based polymer. The film or sheet means a plastic film, which has a thickness of generally 10-500 μm, preferably 20-400 μm, more preferably 30-300 μm.

Since lactic acid, which is a material monomer of polylactic acid, has an asymmetric carbon atom, L-form and D-form of optical isomers are present. (A) Polylactic acid to be used in the present invention is a polymer substance comprising lactic acid in an L form as a main component. When the content of the lactic acid in a D form, which is mixed as an impurity during the production, is low, the polymer substance has high crystallinity and high melting point. Therefore, one having the highest possible L-form purity is preferably used, and one having an L-form purity of not less than 95% is more preferably used. The polylactic acid to be used can be a commercially available product. Specific examples include LACEA H-400 (manufactured by Mitsui Chemicals, Inc.) and the like.

(B) Acidic functional group-denatured olefin based polymer to be used in the present invention is mainly added to afford roll-lubricating property of (A) polylactic acid. Examples of the acidic functional group of the acidic functional group-denatured olefin based polymer include carboxyl group, carboxyl derivative group and the like. The carboxyl derivative group is chemically derived from a carboxyl group and, for example, an ester group, an amide group, an imide group, a cyano group and the like can be mentioned.

(B) Acidic functional group-denatured olefin based polymer is obtained by, for example, grafting an acidic functional group-containing unsaturated compound onto an undenatured polyolefin based polymer.

Examples of the undenatured polyolefin based polymer include polyolefins or oligomers thereof such as high density polyethylene, intermediate density polyethylene, low density polyethylene, propylene polymer, polybutene, poly-4-methylpentene-1, copolymer of ethylene and α-olefin, copolymer of propylene and α-olefin and the like, polyolefin based elastomers such as ethylene-propylene rubber, ethylene-propylene-diene copolymer rubber, butyl rubber, butadiene rubber, low crystallinity ethylene-propylene copolymer, propylene-butene copolymer, ethylene-vinylester copolymer, ethylene-methyl(meth)acrylate copolymer, ethylene-ethyl(meth)acrylate copolymer, ethylene-maleic anhydride copolymer, blend of polypropylene and ethylene-propylene rubber and the like, and a mixture of two or more kinds of these. Preferred are propylene copolymer, copolymer of propylene and α-olefin, low density polyethylene and oligomers thereof, and particularly preferred are propylene polymer, copolymer of propylene and α-olefin and oligomers thereof. Examples of the oligomers include those obtained by a molecular weight degradation method by thermal decomposition, or a polymerization method.

Examples of the acidic functional group-containing unsaturated compound include a carboxyl group-containing unsaturated compound, a carboxyl derivative group-containing unsaturated compound and the like. Examples of the carboxyl group-containing unsaturated compound include maleic acid (anhydride), itaconic acid (anhydride), chloroitaconic acid (anhydride), chloromaleic acid (anhydride), citraconic acid (anhydride), (meth)acrylic acid and the like. In addition, examples of the carboxyl derivative group-containing unsaturated compound include (meth)acrylic acid ester such as methyl(meth)acrylate, glycidyl(meth)acrylate, 2-hydroxyethyl(meth)acrylate and the like, and vinyl cyanide such as (meth)acrylamide, maleimide and (meth)acrylonitrile and the like. Preferred is a carboxyl group-containing unsaturated compound, more preferred is an acid anhydride group-containing unsaturated compound, most preferred is maleic anhydride.

It is essential that (B) acidic functional group-denatured olefin based polymer has a weight average molecular weight as measured by gel permeation chromatography (GPC) of 10,000-80,000, preferably 15,000-70,000, more preferably 20,000-60,000. A weight average molecular weight of less than 10,000 causes bleeding after forming, and a weight average molecular weight exceeding 80,000 causes separation from polylactic acid during roll kneading. The bleeding refers to a phenomenon of time-course surfacing of a low molecular weight component on the film after the film formation.

(B) Acidic functional group-denatured olefin based polymer preferably has an acid number of 10-70 mg KOH/g, more preferably 20-60 mg KOH/g. When it is less than 10 mg KOH/g, a roll-detaching effect cannot be obtained, and when it exceeds 70 mg KOH/g, plate out on a roll occurs. The plate out in the present invention means attachment or deposit of a component contained in the resin composition or a product and the like resulting from oxidation, decomposition, chemical combination or degradation of such component on the surface of a metal roll during the melt film formation of the resin composition using the metal roll. In the present invention, the acid number was measured according to the neutralization titration method of JIS K0070-1992.

(B) Acidic functional group-denatured olefin based polymer is obtained by reacting an acidic functional group-containing unsaturated compound with an undenatured polyolefin based polymer in the presence of organic peroxide. As the organic peroxide, those generally used as an initiator of radical polymerization can be used. Any of the solution method and the melting method can be used for the reaction. In the solution method, the polymer can be obtained by dissolving a mixture of an undenatured polyolefin based polymer and an acidic functional group-containing unsaturated compound in an organic solvent together with organic peroxide and heating the mixture. The reaction temperature is preferably about 110-170° C. In the melting method, the polymer can be obtained by blending a mixture of an undenatured polyolefin based polymer and an acidic functional group-containing unsaturated compound with organic peroxide, and melt-mixing the mixture to allow reaction. The melt-mixing can be performed in various blending machines such as extruder, prabender, kneader, Banbury mixer and the like, and the kneading temperature is generally within the temperature range from the melting point of the undenatured polyolefin based polymer to 300° C.

(B) Acidic functional group-denatured olefin based polymer may be a commercially available product and, for example, "YOUMEX 1010" (maleic anhydride group-containing denatured polypropylene, acid number: 52 mg KOH/g, weight average molecular weight: 32,000, denaturation proportion: 10 wt %), "YOUMEX 1001" (maleic anhydride group-containing denatured polypropylene, acid number: 26 mg KOH/g, weight average molecular weight: 49,000, denaturation proportion: 5 wt %), "YOUMEX 2000" (maleic anhydride group-containing denatured polyethylene, acid number: 30 mg KOH/g, weight average molecular weight: 20,000, denaturation proportion: 5 wt %), which are manufactured by Sanyo Chemical Industries, Ltd., and the like can be mentioned.

(B) Acidic functional group-denatured olefin based polymer is generally used in 0.1-5.0 parts by weight, preferably 0.3-3.0 parts by weight from the aspects of sustainability of roll-lubricating property effect and maintenance of biomass ratio, per 100 parts by weight of (A) polylactic acid. When it is less than 0.1 part by weight, a roll-lubricating property effect is hardly obtained, and when it exceeds 5.0 parts by weight, an effect according to the amount of addition cannot be obtained, and a decrease in the biomass ratio poses problems. Here, the biomass ratio is a proportion of the dry weight of biomass used relative to the dry weight of a film or sheet.

(C) Tetrafluoroethylene based polymer to be used in the present invention may be a homopolymer of tetrafluoroethylene or a copolymer of tetrafluoroethylene and other monomer.

Examples of usable tetrafluoroethylene based polymer include polytetrafluoroethylene, perfluoroalkoxyalkane, p-fluoroethylenepropene copolymer, ethylene-tetrafluoroethylene copolymer, tetrafluoroethylene-perfluoro diioxole copolymer and the like.

The crystallization promoting effect of a tetrafluoroethylene based polymer for polylactic acid is considered to depend on the crystal structure of the tetrafluoroethylene based polymer. As a result of wide-angle X-ray diffraction, the spacing of lattice planes of crystal lattice of polylactic acid was 4.8 angstrom, and that of tetrafluoroethylene based polymer was 4.9 angstrom. Therefrom the effect of tetrafluoroethylene based polymer as a crystal nucleating agent for polylactic acid is considered to be achieved by an epitaxial action of the tetrafluoroethylene based polymer. Here, the epitaxial action refers to a manner of growth where polylactic acid crystal grows on the surface of a tetrafluoroethylene based polymer and polylactic acid aligns along the crystal face of the crystal surface of the tetrafluoroethylene based polymer.

Since the spacing of planes of a tetrafluoroethylene based polymer depends on the crystal form of the tetrafluoroethylene part even in the case of copolymers, the spacing of planes is the same. Therefore, as long as the crystal form of polytetrafluoroethylene can be maintained and the property does not change markedly, the amount of a copolymerizable component is not particularly limited. Generally, the proportion of a copolymerizable component in a tetrafluoroethylene based polymer is desirably not more than 5 wt %.

Furthermore, the polymerization method of the tetrafluoroethylene based polymer is particularly preferably emulsion polymerization. Since a tetrafluoroethylene based polymer obtained by emulsion polymerization is easily fibrillated and easily takes a network structure in polylactic acid, it is considered effective for promotion of crystallization of polylactic acid in flow field in a melt film formation process.

In addition, for uniform dispersion in polylactic acid, tetrafluoroethylene based polymer particles are preferably denatured with, for example, a polymer having good affinity for polylactic acid such as (meth)acrylic acid ester based polymer.

As commercially available products of acrylic denatured tetrafluoroethylene based polymers, METABLEN A-3000, METABLEN A-3800 and the like are commercially available as METABLEN (registered trade mark) A series from MITSUBISHI RAYON CO., LTD.

(C) Tetrafluoroethylene based polymer is generally used in a proportion of 0.1-10 parts by weight, preferably 1.0-5.0 parts by weight from the aspects of melt tension-improving effect and maintenance of biomass ratio, per 100 parts by weight of polylactic acid (A). When it is less than 0.1 part by weight, a melt tension-improving effect is not sufficient, and when it exceeds 10 parts by weight, an effect according to the amount of addition cannot be obtained, and a decrease in the biomass ratio poses problems.

To provide more effective crystal formation-promoting effect of (C) tetrafluoroethylene based polymer, the present invention contains a crystallization promoting step with controlled temperature conditions during film formation. The crystallization promoting step is a step for promoting crystallization by once retaining a resin composition melt-formed in a film state in the melt film formation step at the crystallization temperature (Tc) in a decreasing temperature process of the resin composition ±10° C. The resin composition melt-formed in a film state is solidified by cooling after a crystallization promoting step. That is, in the crystallization promoting step and the like, a resin composition melt-formed in a film state is exposed to a state controlled to crystallization temperature (Tc)±10° C., whereby crystallization is promoted while maintaining the surface shape after the melt film formation. While the method is not particularly limited, for example, a method wherein a resin composition melt-formed in a film state is directly contacted with a roll, a belt and the like permitting heating to a given temperature to process continuously from film formation is desirable in view of the productivity, since this method requires a short time.

A step in which the temperature can be controlled to the crystallization temperature (Tc) in a decreasing temperature process of the resin composition ±10° C., that is, the crystallization promoting step, is preferably performed for the longest possible time. Although it finally depends on the level of crystallization of the resin composition, the conditions setting the heat deformation ratio to not more than 40% are preferable since use of the film or sheet at such temperature is assumed to be sufficiently possible.

The resin composition of the present invention may contain (D) crystallizing agent. While the crystallizing agent is not particularly limited as long as an effect of promoting crystallization is provided, a substance having a crystal structure with a spacing of planes close to the spacing of planes of the crystal lattice of polylactic acid is desirably selected. This is because a substance with a closer spacing of planes provides a higher effect as a nucleating agent. For example, melamine polyphosphate, melamine cyanurate, zinc phenylphosphonate, calcium phenylphosphonate and magnesium phenylphosphonate of organic substances, talc and clay of inorganic substances and the like can be mentioned. Of these, zinc phenylphosphonate is preferable, which shows the most similar spacing of planes to the spacing of planes of polylactic acid and provides a good crystal formation promoting effect. The crystallizing agent to be used may be a commercially available product. Specifically, for example, zinc phenylphosphonate; ECOPROMOTE (manufactured by Nissan Chemical Industries, Ltd.) and the like can be mentioned.

(D) Crystallizing agent is generally used in a proportion of 0.1-5 parts by weight, preferably 0.3-3 parts by weight from the aspects of better crystal-promoting effect and maintenance of biomass ratio, per 100 parts by weight of the polylactic acid (A). When it is less than 0.1 part by weight, the crystal-promoting effect is not sufficient, and when it exceeds 5 parts by weight, an effect according to the amount of addition cannot be obtained, and a decrease in the biomass ratio poses problems.

To always control the temperature to crystallization temperature, the roll is desirably a metal roll. The resin composition desirably has a composition permitting easy detachment from the metal roll. Also from this aspect, addition of the aforementioned (B) acidic functional group-denatured olefin based polymer is required.

In the present invention, moreover, a calender film forming method may be used as the melt film forming method. In this case, when the temperature of the resin composition during calender-rolling is between the crystallization temperature (Tc) in a decreasing temperature process of the resin composition +15° C. and the melting temperature (Tm) in a raising temperature process −5° C., the crystallization can be further promoted. This aims to achieve an oriented crystallization effect by calendering at a temperature of not more than the melting point. Since (C) tetrafluoroethylene based polymer fibrillates in the resin composition and forms a network, the oriented crystallization effect is strikingly improved. This is considered a synergistic effect with the effect of crystal nucleating agent of (C) tetrafluoroethylene based polymer. By calendering within the above-mentioned temperature range, a smooth face state and a good oriented crystallization effect can be obtained.

The polylactic acid based film or sheet of the present invention can be obtained by preparing a resin composition containing each component uniformly dispersed in a continuous melt kneader having a twin-screw extruder and the like, or a batch type melt kneader such as pressurization kneader, Banbury mixer, roll kneader and the like, passing the composition in a molten state through a gap between two metal rolls to a desired thickness, and further through rolls set to a temperature-decreasing crystallization temperature of the resin composition and finally cooling the composition.

Specific examples of the film forming method include a method including continuously supplying a resin composition prepared in a molten state in an extruder to a metal roll part by an apparatus equipped with about 2-4 metal rolls which is set after the extruder and the like (polishing film forming method, roller head film forming method), and film forming to a desired thickness in the metal roll part, a calender film forming method including sequentially passing a resin composition prepared in a molten state by roll kneading, an extruder and the like through a gap between about 3 to 6 metal rolls to finally achieve a desired thickness, and the like. In both methods, since a resin in a molten state is passed through a gap between heated metal rolls, the composition thereof desirably permits easy detachment from the metal roll surface. Furthermore, to always control the crystallization temperature, a roll to be set to a temperature-decreasing crystallization temperature is also desirably a metal roll. The composition desirably permits easy detachment from the metal roll also in this step. From the aspects mentioned above, addition of the aforementioned (B) acidic functional group-denatured olefin based polymer is required.

While the thickness of the film or sheet is appropriately adjusted depending on the use thereof, it is generally 10-500 μm, preferably 20-400 μm, particularly preferably 30-300 μm. The film or sheet of the present invention can be applied to use similar to that of a generally-used film or sheet, and is particularly preferably used as a substrate of an adhesive film or sheet.

When the temperature of a resin composition in an extruder or roll film formation is between the crystallization temperature (Tc) in a decreasing temperature process of the resin composition +15° C. and the melting temperature (Tm) in a raising temperature process −5° C., crystallization can be promoted. This aims to achieve an oriented crystallization effect by film forming at a temperature not more than the melting point. Since (C) tetrafluoroethylene based polymer fibrillates in the resin composition and forms a network, the oriented crystallization effect is strikingly improved. This is considered a synergistic effect with the effect of crystal nucleating agent of (C) tetrafluoroethylene based polymer. By film forming within the above-mentioned temperature range, a smooth face state and a good oriented crystallization effect can be obtained.

In the present invention, optimal crystallization conditions can be always obtained even when the crystallization temperature of a resin mixture changes due to the addition of other crystal nucleating agent and the like, by measuring with a differential scanning calorimeter (hereinafter to be abbreviated as DSC) in advance, and grasping the maximum temperature of the exothermic peak associated with crystallization in a decreasing temperature process. In this case, change of the shape of the formed film due to the change of the heating temperature does not need to be considered.

In addition, since the film or sheet is solidified by cooling after crystallization thereof in the crystallization promoting step, the internal stress hardly remains, and an extreme heat shrinkage does not occur during use. Therefore, a high crystallization film or sheet formed by the technique of the present invention can maintain the shape up to around the melting point of polylactic acid, and can also be sufficiently applied to use requiring heat resistance, which has been unavailable heretofore.

Furthermore, the method is highly useful also from the aspects of economic efficiency and productivity, since a step for heating again is not necessary.

FIG. 1 is a schematic showing of a calender film forming machine in one embodiment of the present invention. For a detailed explanation of FIG. 1, a molten resin is calendered between four calendar-rolls (first roll 1, second roll 2, third roll 3 and fourth roll 4) to gradually reducing the thickness, and prepared to achieve a desired thickness when finally passing between roll 3 and roll 4. In the case of calender film formation, the film formation of a resin composition using calender-rolls 1 to 4 corresponds to the "melt film formation step". In addition, a take-off roll 5 set to the crystallization temperature shows a roll group with which a prepared film or sheet 8 contacts first, which consists of one or more (3 rolls in FIG. 1) roll groups, and plays a role of detaching sheet 8 in a molten state from a calender-roll 4. When the number of take-off rolls 5 is large, the isothermal crystallization time becomes long, which is advantageous for promoting crystallization. In the case of calender film formation, since crystallization of sheet 8 melt-formed in a film state is promoted by take-off roll 5, a step of passage of sheet 8 through the take-off roll 5 corresponds to the "crystallization promoting step". Two cooling rolls 6 and 7 play a role of cooling to solidify sheet 8 by passing sheet 8 between them and forming the surface of the sheet 8 to a desired shape. Generally, therefore, one of the rolls (e.g., roll 6) is a metal roll with a designed roll surface to form the surface shape of the sheet 8, and the other roll is a rubber roll (e.g., roll 7). The arrows in the Figure show the direction of rotation of the rolls.

Figure 2:
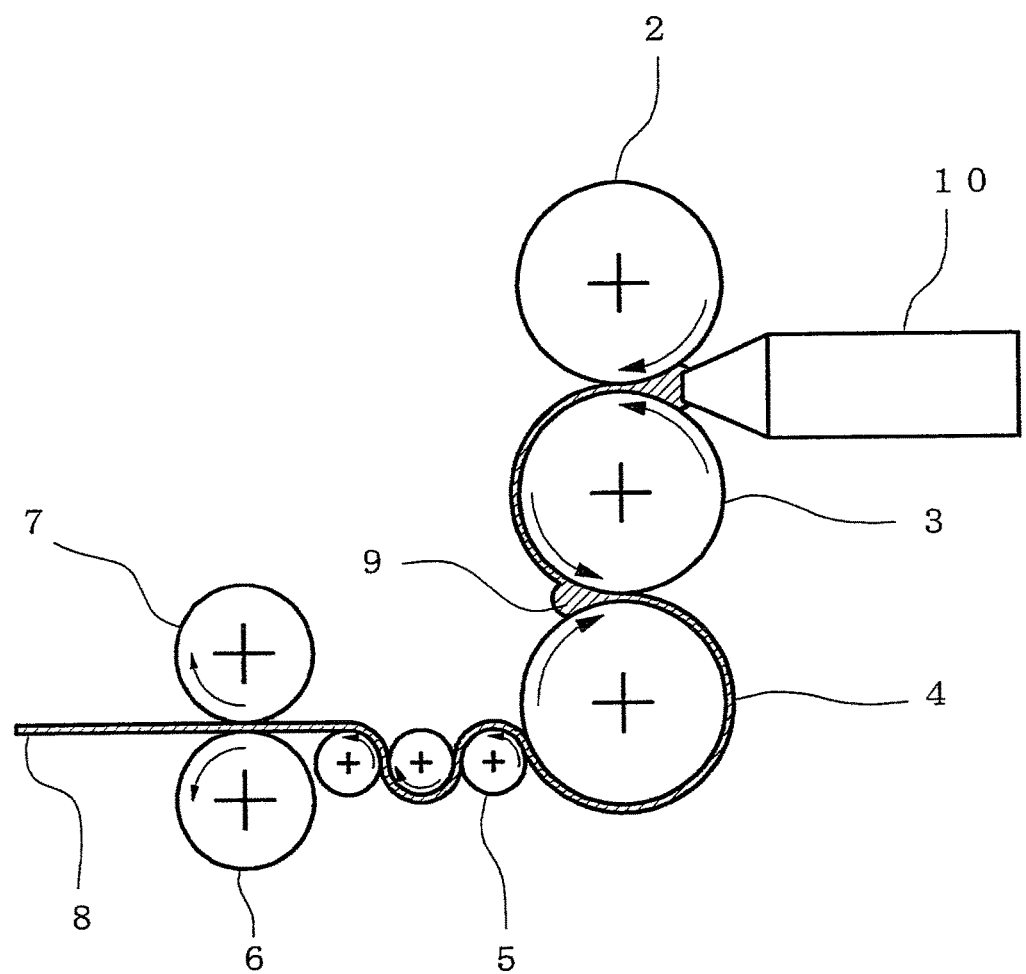
FIG. 2 is a schematic showing of a polishing film forming machine.

FIG. 2 is a schematic showing of a polishing film forming machine in another embodiment of the present invention. As shown in FIG. 2, an extruder tip 10 of an extruder (not shown) is configured between heated rolls 2 and 3, and a molten resin is continuously extruded between rolls 2 and 3 at a predetermined extrusion speed. The extruded molten resin becomes thin by being calendered between rolls 2 and 3, and is prepared such that a desired thickness is achieved by finally passing through between roll 3 and roll 4. Thereafter, the resin passes through three take-off rolls 5 set to the crystallization temperature, and finally passes through cooling rolls 6 and 7 to give a solidified sheet 8.

EXAMPLES

The present invention is explained in more detail in the following by referring to Examples and Comparative Examples, which are not to be construed as limitative. The evaluations in Examples and the like were performed as follows.

Abbreviations of the material names used in Table 1 mentioned below are shown in the following.

Polylactic Acid

A1: LACEA H-400 (manufactured by Mitsui Chemicals, Inc.) acidic functional group-denatured olefin based polymer B1: maleic anhydride group containing denatured polypropylene (weight average molecular weight=49,000, acid number=26 mg KOH/g): YOUMEX 1001 (manufactured by Sanyo Chemical Industries, Ltd.)

B2: maleic anhydride group-containing denatured polypropylene (weight average molecular weight=32,000, acid number=52 mg KOH/g): YOUMEX 1010 (manufactured by Sanyo Chemical Industries, Ltd.)

B': undenatured low molecular weight polypropylene (weight average molecular weight=23,000, acid number=0 mg KOH/g): VISCOL 440P (manufactured by Sanyo Chemical Industries, Ltd.)

Polytetrafluoroethylene Based Polymer

C1: polytetrafluoroethylene: Fluon CD-014 (manufactured by ASAHI GLASS CO., LTD.)

C2: acrylic denatured polytetrafluoroethylene: METABLEN A-3000 (manufactured by MITSUBISHI RAYON CO., LTD.)

C': high molecular weight acrylic polymer: METABLEN P-531A (manufactured by MITSUBISHI RAYON CO., LTD.) crystallizing agent D1: zinc phenylphosphonate: ECOPROMOTE (manufactured by Nissan Chemical Industries, Ltd.)

Example 1

A resin composition comprising the above-mentioned starting materials mixed at the mixing ratios shown in the following Table 1 was prepared, melt kneaded in a Banbury mixer, and subjected to film formation by an inverted L-type 4-roll calender to a thickness of 0.1 mm. Then, immediately after calender-rolling film formation (corresponding to melt film formation step) as shown in FIG. 1, three rolls permitting heating to any temperature (take-off roll in the case of calender film formation) were provided such that a calendered film can alternately pass up and down to form a crystallization promoting step. Thereafter, the film is solidified by passing through cooling rolls. The resin temperature in the calender process (that is, resin temperature in the melt film formation step) is substituted by the surface temperature of calender-roll 4 in the case of the calender film formation. The film formation rate is 5 m/min, and the substantial crystallization time (take-off roll passage time) is about 5 seconds.

Examples 2-10

The resin compositions mixed at mixing ratios shown in the following Table 1 were prepared, and the films of Examples 2-10 were film-formed in the same manner as in Example 1.

Comparative Examples 1-4

The resin compositions mixed at mixing ratios shown in the following Table 1 were prepared, and the films of Comparative Examples 1-4 were film-formed in the same manner as in Example 1.

<Melting Temperature>

The temperature at the top endothermic peak as measured by DSC, which is associated with melting in the re-raising temperature process of the film sample after film formation, was taken as a melting temperature (to be also referred to as Tm, crystal melting peak temperature).

<Crystallization Temperature>

The temperature at the peak top of the endothermic peak, as measured by DSC, which is associated with crystallization in a decreasing temperature process of the film sample from 200° C. after film formation was taken as a crystallization temperature (to be also referred to as Tc, crystallization peak temperature).

<Resin Temperature in Melt Film Formation Step>

Resin temperature is a set temperature (° C.) of a resin in a melt film formation step. In the case of calender film formation, for example, it corresponds to the temperature of a resin composition in the calendar step of the resin composition with calender-rolls. In Examples 1-10 and Comparative Examples 1-4, the surface temperature of the fourth roll was measured and taken as a resin temperature in the melt film formation step.

<Crystallization Promoting Temperature>

In this embodiment, a crystallization promoting step was performed by contacting a film sample with a take-off roll. In this case, the surface temperature of three take-off rolls 5 in FIG. 1 was substantially the same, and the temperature was taken as the crystallization promoting temperature (° C.). In the present invention, the crystallization promoting temperature is preferably crystallization temperature (Tc) ±10° C. In addition, as long as the temperature is within said temperature range, three take-off rolls may have different temperatures.

<Film Formation Property Results>

(1) plating out on roll: Staining of the roll surface was visually evaluated, and no soil on the roll surface was evaluated as "none" and soil on the roll surface was evaluated as "present". Measurement was not performed in Comparative Examples 1 and 2 since film formation by calender was not possible.

(2) Release property of film: The release property of a molten film from the fourth roll 4 was evaluated and a film that can be taken by a take-off roll was evaluated as "good" and a film that cannot be taken by a take-off roll was evaluated as "failure".

(3) Film surface state: The film surface was visually evaluated and a smooth surface free of roughness was evaluated as "good", and a surface with bank mark (concaves and convexes due to irregularity of resin flow), sharkskin and pinhole was evaluated as "failure". Measurement was not performed in Comparative Examples 1 and 2 since film formation by calendar could not be performed.

<Calculation Method of Relative Crystallization Ratio>

The ratio was calculated by the following formula (3) from the amount of heat $\Delta Hc$ at the exothermic peak associated with crystallization in a raising temperature process of a film sample after film formation, and the amount of heat $\Delta Hm$ associated with melting thereafter, which were measured by DSC. Measurement was not performed in Comparative Examples 1 and 2 since film formation by calendar could not be performed.

$$\text{relative crystallization ratio (\%)} = (\Delta Hm - \Delta Hc)/\Delta Hm \times 100 \quad (3)$$

(Pass-fail judgment) A relative crystallization ratio of not less than 50% passes.

DSC used for the measurement of crystallization temperature and relative crystallization ratio and the measurement conditions were as follows.
(Test Apparatus) DSC6220 Manufactured by SII NanoTechnology Inc.
(Test Conditions)
a) measurement temperature range 20° C.→200° C.→0° C.→200° C.
(Performed were measurement in a raising temperature process from 20° C. to 200° C., followed by the measurement in a decreasing temperature process from 200° C. to 0° C., and the last measurement in a re-raising temperature process from 0° C. to 200° C.)
b) temperature-raising/decreasing speed: 2° C./min
c) measurement atmosphere: under a nitrogen atmosphere (200 ml/min)

Since a peak associated with crystallization was not found in the re-raising temperature process, the crystallizable region was judged to crystallize 100% at a temperature rising rate of 2° C./min, and the validity of the calculation formula of the relative crystallization ratio was confirmed.

<Heat Deformation Ratio>
The ratio was measured according to the Heat deformation test method of JIS C 3005. The measuring apparatus used and the measurement conditions were as follows.
(measurement apparatus) heat deformation testing machine manufactured by TESTER SANGYO CO., LTD.
(sample size) thickness 1 mm×width 25 mm×length 40 mm (films were laid in a total thickness of 1 mm)
(measurement conditions)
a) measurement temperature (150° C.)
b) load (10N)
c) measurement time: 30 min (in consideration of recrystallization, the test was started without ageing) (heat deformation ratio calculation method) Thickness T1 before the test and thickness T2 after the test were measured, and the ratio was calculated according to the following formula (4). Measurement was not performed in Comparative Examples 1 and 2 since film formation by calendar could not be performed.

$$\text{heat deformation ratio (\%)} = (T1-T2)/T1 \times 100 \quad (4)$$

(pass-fail judgment) Ratio of not more than 40% passes.

<Heat Shrinkage Ratio>
The film was cut into 150 mm×150 mm, and a gauge of 100 mm was written in the machine direction (hereinafter to be referred to as MD direction) and the width direction (hereinafter to be referred to as TD direction) in the film formation. The film was placed for 10 min in an oven heated to 150° C., and dimensional changes after taking out therefrom were confirmed.

Heat shrinkage ratio calculation method; Gauge length L1 before the test and gauge length L2 after the test were measured, and the ratio was calculated according to the following formula (5). Measurement was not performed in Comparative Examples 1 and 2 since film formation by calendar could not be performed.

$$\text{heat shrinkage ratio (\%)} = (L1-L2)/L1 \times 100 \quad (5)$$

(pass-fail judgment) Ratio of not more than 5% in either the MD direction or TD direction passes.

(total judgment) The total judgment was that, as the total evaluation results, a film meeting the pass criteria in all evaluation results is ○, a film meeting the pass criteria of the items relating to crystallization ratio is Δ, and a film that fails to meet the pass criteria of the items relating to relative crystallization ratio is x.

The evaluation results of Examples 1-10 and Comparative Examples 1-4 are shown in Table 2 and Table 3, respectively.

TABLE 1

| material name | A1 | B1 | B2 | B' | C1 | C2 | C' | D1 |
|---|---|---|---|---|---|---|---|---|
| Ex. 1 | 100 | 3 | — | — | 0.2 | — | — | — |
| Ex. 2 | 100 | — | 2 | — | — | 3 | — | — |
| Ex. 3 | 100 | 1 | — | — | 1 | — | — | 1 |
| Ex. 4 | 100 | — | 0.5 | — | 3 | — | — | — |
| Ex. 5 | 100 | 4 | — | — | — | 8 | — | — |
| Ex. 6 | 100 | — | 1 | — | — | 4 | — | 4 |
| Ex. 7 | 100 | — | 0.5 | — | 3 | — | — | — |
| Ex. 8 | 100 | — | 6 | — | 2 | — | — | — |
| Ex. 9 | 100 | 0.5 | — | — | — | 12 | — | — |
| Ex. 10 | 100 | — | 2 | — | — | 4 | — | — |
| Comp. Ex. 1 | 100 | — | — | — | 1 | — | — | — |
| Comp. Ex. 2 | 100 | — | — | 2 | — | 2 | — | — |
| Comp. Ex. 3 | 100 | — | 1 | — | — | 3 | — | — |
| Comp. Ex. 4 | 100 | 2 | — | — | — | — | 5 | — | unit: parts by weight

TABLE 2

| | evaluation | Example 1 | Example 2 | Example 3 | Example 4 | Example 5 | Example 6 | Example 7 |
|---|---|---|---|---|---|---|---|---|
| resin composition | melting temperature | 167 | 167 | 167 | 167 | 167 | 167 | 167 |
| DSC data (° C.) | crystallization temperature | 124 | 125 | 131 | 125 | 125 | 135 | 125 |
| set temperature (° C.) | resin temperature in melt film forming step | 157 | 157 | 157 | 168 | 168 | 168 | 158 |
| | crystallization promoting temperature | 124 | 124 | 131 | 125 | 125 | 135 | 100 |
| film formation property results | plate out on roll | none | none | none | none | none | none | none |
| | release property | good | good | good | good | good | good | good |
| | film surface state | good | good | good | good | good | good | good |
| | relative crystallization ratio (%) | 76 | 82 | 83 | 52 | 65 | 78 | 63 |
| | heat deformation ratio (%) | 5 | 2 | 1 | 35 | 23 | 2 | 21 |
| | heat shrinkage ratio (MD) (%) | 3 | 1 | 1 | 3 | 4 | 2 | 2 |
| | heat shrinkage ratio (TD) (%) | 2 | 0 | 1 | 2 | 2 | 1 | 1 |
| | total judgment | ○ | ○ | ○ | ○ | ○ | ○ | ○ |

TABLE 3

| evaluation | | Example 8 | Example 9 | Example 10 | Comparative Example 1 | Comparative Example 2 | Comparative Example 3 | Comparative Example 4 |
|---|---|---|---|---|---|---|---|---|
| resin composition DSC data (° C.) | melting temperature | 167 | 167 | 167 | 167 | 167 | 167 | 167 |
| | crystallization temperature | 125 | 128 | 125 | 124 | 124 | 125 | 118 |
| set temperature (° C.) | resin temperature in melt film forming step | 157 | 168 | 135 | 157 | 157 | 168 | 157 |
| | crystallization promoting temperature | 125 | 128 | 125 | 124 | 124 | 155 | 118 |
| film formation property results | plate out on roll | yes | none | none | — | — | none | none |
| | release property | good | good | good | failure | failure | good | good |
| | film surface state | good | failure | failure | — | — | good | good |
| relative crystallization ratio (%) | | 77 | 81 | 70 | — | — | 42 | 37 |
| heat deformation ratio (%) | | 3 | 1 | 8 | — | — | 48 | 58 |
| heat shrinkage ratio (MD) (%) | | 1 | 8 | 4 | — | — | 1 | 3 |
| heat shrinkage ratio (TD) (%) | | 0 | 7 | 3 | — | — | 1 | 2 |
| total judgment | | Δ | Δ | Δ | x | x | x | x |

From the evaluation results shown in Table 2 and Table 3, since all of Examples 1-10 relating to the present invention showed high relative crystallization ratios and, as a result, suppressed heat deformation ratios. Therefore, the total judgment was (○ or Δ). In addition, as for the film formation property, the release property and film surface state were all good and the plate out onto a roll did not occur.

Among Examples 1-10, the films of Examples 1-3 and 8 wherein (i) the melt film formation step was performed at a temperature of the resin composition between the crystallization temperature (Tc) in a decreasing temperature process of the resin composition +15° C. and the melting temperature (Tm) in a raising temperature process −5° C., and (ii) the resin composition melt-formed in a film state was solidified by cooling after a crystallization promoting step at crystallization temperature (Tc) in the decreasing temperature process ±10° C. showed further promoted crystallization since the crystallization step was performed at 2 steps. For example, when compared to the relative crystallization ratio (63%) of the film of Example 7 via only the treatment of the above-mentioned (i), and the relative crystallization ratio (52%) of the film of Example 4 via only the treatment of the above-mentioned (ii), Example 2 via both the treatments of the above-mentioned (i) and (ii) shows a higher crystallization ratio of 82%.

In contrast, Comparative Examples 1-4 which do not satisfy the mixing ratio or do not follow the production steps of the present invention showed relative crystallization ratios of less than 50%, thus failing to provide a film satisfying the desired property value of heat deformation ratio. Thus, the total judgment thereof was always x.

This application is based on a patent application No. 2008-257383 filed in Japan, the contents of which are incorporated in full herein.

EXPLANATION OF SYMBOLS

1 first roll
2 second roll
3 third roll
4 fourth roll
5 take-off roll
6 cooling roll
7 cooling roll
8 cooled calendered sheet
9 bank (resin pool)
10 extruder tip

The invention claimed is:

1. A method of producing a film or sheet of a resin composition containing a polylactic acid according to a melt film forming method, wherein the resin composition comprises polylactic acid (A), an acidic functional group-denatured olefin based polymer (B) containing an acidic functional group, and having an acid number of 10-70 mg KOH/g and a weight average molecular weight of 10,000-80,000, and a tetrafluoroethylene based polymer (C),
    which method comprises forming the film or sheet from the resin composition by a melt film formation,
    wherein, during the melt film formation, the resin composition has a temperature between a temperature 15° C. higher than a crystallization temperature (Tc) of the resin composition in a decreasing temperature process and a temperature 5° C. lower than a melting temperature (Tm) of the resin composition in a raising temperature process, or
    the melt film formed resin composition is solidified by cooling the melt film formed resin composition after a crystallization promoting step at a temperature which is between 10° C. below and 10° C. above the crystallization temperature (Tc) of the resin composition in the decreasing temperature process.

2. The production method according to claim 1, wherein, during the melt film formation, the resin composition has the temperature between the temperature 15° C. higher than the crystallization temperature (Tc) of the resin composition in the decreasing temperature process and the temperature 5° C. lower than the melting temperature (Tm) of the resin composition in the raising temperature process, and the melt film formed resin composition is solidified by cooling the melt film formed resin composition after the crystallization promoting step at the temperature which is between 10° C. below and 10° C. above the crystallization temperature (Tc) of the resin composition in the decreasing temperature process.

3. The production method according to claim 1, wherein the resin composition comprises the acidic functional group-denatured olefin based polymer (B) in an amount of 0.1-5.0 parts by weight per 100 parts by weight of the polylactic acid (A).

4. The production method according to claim 1, wherein the resin composition comprises the tetrafluoroethylene based polymer (C) in an amount of 0.1-10.0 parts by weight per 100 parts by weight of the polylactic acid (A).

5. The production method according to claim 1, wherein the melt film forming method is a technique comprising finally passing the resin composition in a molten state through a gap between two metal rolls to achieve a desired film thickness.

6. The production method according to claim 5, wherein the melt film forming method is a calender film forming method.

7. The production method according to claim 1, wherein the acidic functional group in the acidic functional group-denatured olefin based polymer is an acid anhydride.

8. The production method according to claim 1, wherein the resin composition further comprises 0.1-5.0 parts by weight of crystallizing agent (D) per 100 parts by weight of the polylactic acid (A).

9. The production method according to claim 1, wherein the crystallization promoting step of the resin composition is achieved by a metal roll.

10. A method of producing a film or sheet of a resin composition containing a polylactic acid according to a calender film forming method, wherein the resin composition comprises 100 parts by weight of polylactic acid (A), 0.1-5.0 parts by weight of an acidic functional group-denatured olefin based polymer (B) containing an acidic functional group, and having an acid number of 10-70 mg KOH/g and a weight average molecular weight of 10,000-80,000, and 0.1-10.0 parts by weight of a tetrafluoroethylene based polymer (C), which method comprises forming the film or sheet from the resin composition by calender-rolling, wherein, during the calender-rolling, the resin composition has a temperature between a temperature 15° C. higher than a crystallization temperature (Tc) of the resin composition in a decreasing temperature process and a temperature 5° C. lower than a melting temperature (Tm) of the resin composition in a raising temperature process, or the melt film formed resin composition is solidified by cooling the melt film formed resin composition after a crystallization promoting step at a temperature which is between 10° C. below and 10° C. above the crystallization temperature (Tc) of the resin composition in the decreasing temperature process.

11. The production method according to claim 10, wherein, during the calender-rolling the resin composition has the temperature between the temperature 15° C. higher than the crystallization temperature (Tc) of the resin composition in the decreasing temperature process and the temperature 5° C. lower than the melting temperature (Tm) of the resin composition in the raising temperature process, and the melt film formed resin composition is solidified by cooling the melt film formed resin composition after the crystallization promoting step at the temperature which is between 10° C. below and 10° C. above the crystallization temperature (Tc) of the resin composition in the decreasing temperature process.

12. The production method according to claim 10, wherein the acidic functional group in the acidic functional group-denatured olefin based polymer is an acid anhydride.

13. The production method according to claim 10, wherein the resin composition further comprises 0.1-5.0 parts by weight of crystallizing agent (D) per 100 parts by weight of the polylactic acid (A).

14. The production method according to claim 10, wherein the crystallization promoting step of the resin composition is achieved by a metal roll.

* * * * *